Aug. 6, 1974     C. S. BAUM     3,827,885
METHOD OF MAKING TIRE STUD
Original Filed May 15, 1970
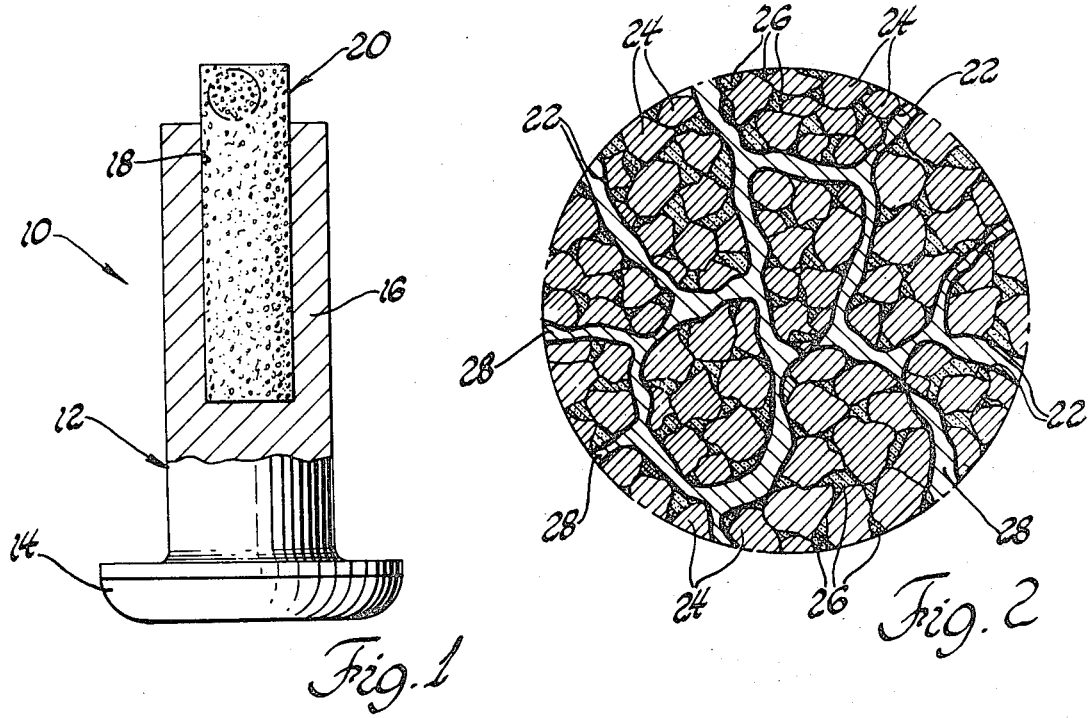
Fig. 1
Fig. 2
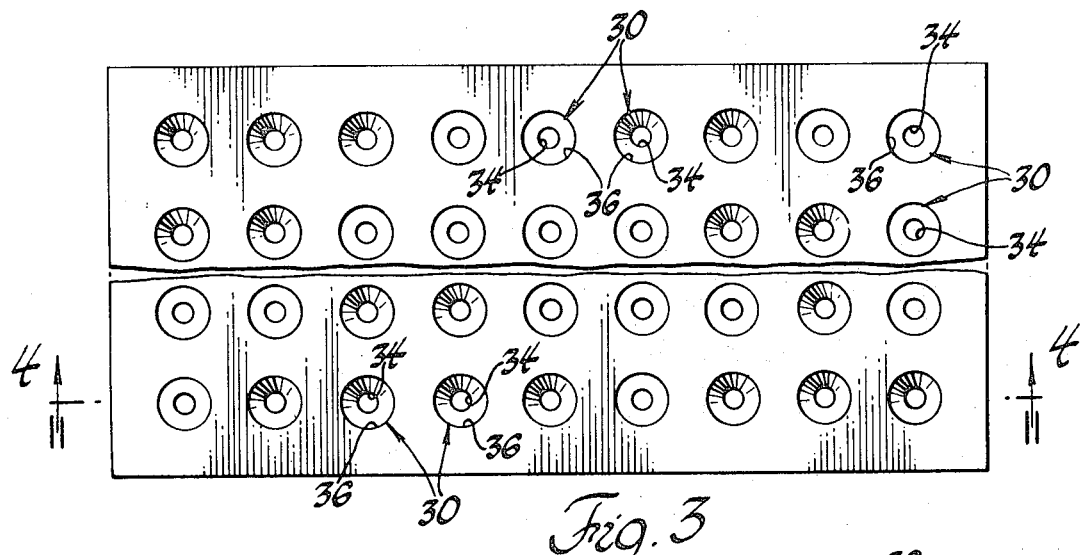
Fig. 3
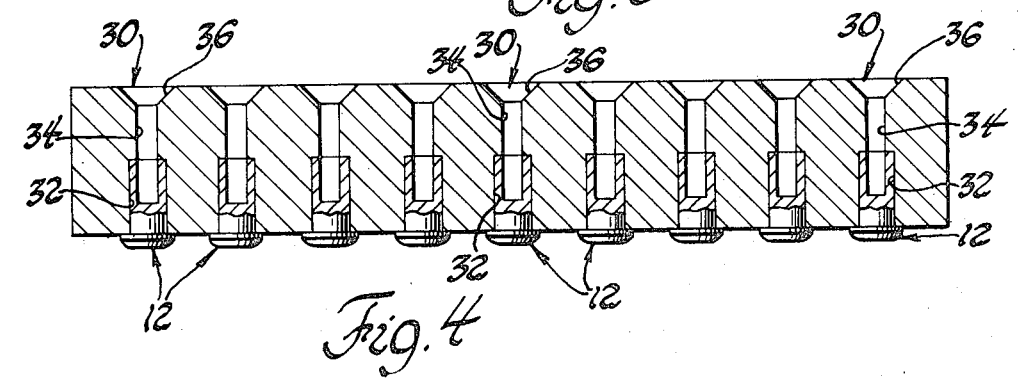
Fig. 4

United States Patent Office 3,827,885
Patented Aug. 6, 1974

3,827,885
METHOD OF MAKING TIRE STUD
Charles S. Baum, St. Clair Shores, Mich., assignor to Textron Inc., Providence, R.I.
Original application May 15, 1970, Ser. No. 37,708. Divided and this application May 17, 1973, Ser. No. 361,360
Int. Cl. B22f 5/00
U.S. Cl. 75—208 R    8 Claims

ABSTRACT OF THE DISCLOSURE

A tire stud and the method of making same. The tire stud includes an elongated metal body having a head at one end and a shank extending from the head with a cavity extending into the shank toward the head. In making the completed stud, the body is disposed in a bore having a shank receiving portion and a smaller portion which is generally of the same cross sectional area as the cavity and which extends upwardly from the cavity to an opening. Material is disposed through the opening to fill the cavity and at least a part of the smaller portion of the bore above the cavity. These materials include particles made of carbon grains sintered together by a binder such as cobalt and an additional filler metal powder. The filler metal powder is melted so as to fill the spaces between the particles and thereafter solidifies to form a composite of the particles bonded together by the filler material.

---

This application is a divisional of my earlier filed copending application Ser. No. 37,708, filed May 15, 1970.

This invention relates to a stud for pneumatic snow tires, the stud being imbedded in the rubber or other elastomeric material of the tire to provide increased traction.

As is well known, that portion of the stud which is to engage the roadway must be of very tough, wear-resistant material. By far, the most commercially successful tire stud is of the type comprising an elongated metal body with a head on one end and a bore extending into the body with a sintered tungsten carbide insert secured in the bore and extending therefrom for engaging the pavement. Until now, those skilled in the art believed that carbides such as sintered tungsten carbide formed into an insert body were the only practical materials to use to obtain the requisite wear characteristics. An example of such a stud is shown in U.S. Pat. 3,125,147.

Sintered tungsten carbide comprises individual grains of carbide bound together by a binding metal such as cobalt. Other binding materials may be utilized but cobalt is preferred and is most widely used because cobalt dissolves only about one percent of the tungsten carbide and has a superior ability to wet the carbide at elevated temperatures as during sintering.

Sintered tungsten carbide is frequently manufactured by placing a tungsten carbide powder with a cobalt powder in a ball mill for crushing and thereafter screening the crushed mixture and pressing this mixture into a form. Thereafter, the form is sintered by placing it in a furnace or oven and elevated to a temperature that melts the cobalt. By comparison, a tire stud made in accordance with the instant invention is much less expensive.

One of the operational problems associated with the present tire studs which have a metal body with the tungsten carbide extending therefrom, is that the wear of the tungsten carbide is not commensurate with the wear of the metal body and the tire. The metal body surrounding the tungsten carbide wears rapidly compared to the tungsten carbide, as does the tire. Frequently, the elongated length of tungsten carbide is sharpened during wear and is forced back into the tire to puncture the tire. In other words, one of the problems with the present tire studs utilizing tungsten carbide is that the tungsten carbide is too wear resistant.

Accordingly, it is an object and feature of this invention to provide an improved tire stud used to overcome the economic and operational disadvantages of the prior art tire studs.

In correlation with the foregoing object and feature, it is another object and feature of this invention to provide an improved tire stud which utilizes presently used carbide but is in a different form which is more economical to manufacture and which provides the desired wear characteristics.

In correlation with the foregoing objects and features, it is another object and feature of this invention to provide a tire stud employing particles made up of grains of carbide sintered together by a binder metal with the particles in turn being bonded together by a filler metal.

In correlation with the foregoing objects and features, it is another object and feature of this invention to provide a tire stud employing particles made up of grains of tungsten carbide sintered together with cobalt as a binder with these particles in turn being bonded together by copper or nickel.

Other objects and attendant advantages of the present invention will be readily appreciated as the same becomes better understood by reference to the following detailed description when considered in connection with accompanying drawings wherein:

FIG. 1 is a fragmentary cross sectional view showing a preferred embodiment of a tire stud manufactured in accordance with the instant invention;

FIG. 2 is an enlarged view of the materials shown in the circle indicated in FIG. 1;

FIG. 3 is a plan view of a mold which may be utilized in manufacturing tire studs in accordance with the instant invention; and FIG. 4 is a cross sectional view taken substantially along line 4—4 of FIG. 3.

Referring now to the drawings wherein like numerals indicate like or corresponding parts throughout the several views, a tire stud constructed in accordance with the instant invention is generally shown at 10.

The tire stud 10 includes a metal body generally indicated at 12. The body 12 has opposite ends with a head 14 at one end and a shank portion 16 extending from the head 14 to the opposite end. A cavity 18 extends into the opposite end and terminates short of the head 14. The outer configuration of the body 12 is bolt-like in that the shank portion is circular. The body 12 is made of a metal such as steel.

A composite body, generally indicated at 20, is disposed and retained in the cavity 18 and extends from the cavity and the body 12.

The composite body 20 includes particles 22 made up of carbon grains 24 sintered together with a binder metal 26. The particles 22 are bound together by a filler metal 28 surrounding and filling the spaces between and binding together the particles 22.

More specifically, the particles comprise tungsten carbide grains 24 sintered together with cobalt 26, i.e. the cobalt is the binder metal. The filler metal 28 is at least in part, i.e. an alloy, of the metal from the group comprising copper and nickel. In other words, the filler metal is either copper or nickel or an alloy thereof.

There is a plentiful supply of discarded carbide parts. As an example, tungsten carbide cutting inserts are disposed in milling head cutting wheels and after sufficient wear are thrown away and hence are known as "throwaway" inserts. Tons of these inserts are discarded daily in manufacturing plants which utilize machines or the like. These "tungsten carbide" tools are sintered tungsten carbide manufactured as set forth above and therefore comprise tungsten carbide grains sintered together with a binder metal such as cobalt. In accordance with the instant invention these discarded parts are crushed to obtain particles which will comprises tungsten carbide grains sintered together by cobalt.

These particles are utilized in the instant invention by utilizing a mold such as that shown in FIGS. 3 and 4. The mold shown in FIGS. 3 and 4 includes a plurality of bores 30. Each bore 30 has a shank receiving portion 32 for receiving the shank 16 of the metal body 12. Each bore also includes a smaller portion 34 which is generally of the same cross sectional area or diameter as the cavity 18 and extends upwardly from the cavity 18 to a tapered opening 36.

In accordance with the instant invention, scrap parts are crushed to the desired particle size and the particles are disposed through the opening 36 to fill the cavity 32 in the metal member 12. Also inserted through the opening 36 is a powdered filler metal such as copper. The powdered metal and the particles may be pre-mixed before disposition into the bores or the particles may be inserted first with the metal powder associated therewith by being disposed in a layer thereabove. In any case, the total combination fills the cavity 18 in the shank 16 and at least a length of the smaller portion 34 of the bore. Once this is accomplished the entire mold is placed in a furnace or oven and raised to a temperature for melting the powdered metal so that the filler metal 28 flows about particles 22 to fill the spaces therebetween. The composite is allowed to solidify by cooling whereby the particles 22 are bonded together by the filler material 28. The filler metal also adheres to the metal body to retain the composite in the cavity 18.

The tire stud 10 constructed in accordance with this invention when operatively associated with a tire, provides improved characteristics in that the composite insert 20 wears commensurately with the wear of the pedal body 12 and therefore overcomes the problems associated with the prior art tire stud. The reason for the wear of the composite 20 being more commensurate with the wear of the metal body 12 is that the particles 22 provide all of the wear resistant characteristics known to previously utilized solid sintered tungsten carbide, yet the filler metal such as the copper or nickel neagtes to some degree such wearing characteristics so that the insert, albeit providing the requisite wear characteristics, is not so tough in wear resistance that problems are created.

It will be appreciated that since the basic tungsten carbide material may be purchased as scrap and merely crushed to the desired particle size, that tire studs constructed in accordance with the instant invention are much less expensive than tire studs using a solid insert of sintered tungsten carbide yet provides the requisite wear characteristics without being so tough so as to create problems associated with the prior art tire studs.

The mold may be subjected to a temperature of approximately 1800 to 2400 degrees F. to effect the melting of the filler material. When the filler material is copper it is preferably heated to a temperature sufficient for the copper to thoroughly wet the particles 22. Copper melts at about 1850° F. but it is preferably heated at least to a brazing temperature of 2050° F. so that a metalluragical bond occurs between the copper and the particles as the filler metal infiltrates the particles.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method of making an article suitable for use as a tire stud of the type including a body having a head and a shank with the extremity opposite the head made by the steps of: disposing carbide grains sintered together by a binder metal to form particles in association with a filler metal powder within a cavity in the shank and raising the temperature of the metal powder so that the filler metal bonds the particles together.

2. A method of making an article suitable for use as a tire stud of the type including a metal body having a head at one end and a cavity extending thereinto from the opposite end, said method comprising the steps of: disposing particles made of carbide grains sintered together by a binder metal in said cavity, disposing a filler metal powder in association with said particles, and raising the temperature of the metal powder so that the metal flows about the particles to fill the spaces therebetween and allowing the filler metal to solidify to form a composite of the particles bonded together by the filler metal.

3. A method as set forth in claim 2 wherein said particles comprise sintered tungsten carbide.

4. A method as set forth in claim 2 wherein said particles comprise tungsten carbide grains sintered together with cobalt as said binder metal.

5. A method as set forth in claim 2 wherein said filler metal is at least in part of a metal group comprising copper and nickel.

6. A method as set forth in claim 5 wherein said particles comprise tungsten carbide grains sintered together with cobalt as said binder metal.

7. A method as set forth in claim 2 including packing said carbide particles into said cavity.

8. A method for making a tire stud of the type including an elongated metal body having a head at one end and a shank extending from the head with a cavity extending into the shank toward the head, said method comprising the steps of: disposing the body in a bore having a shank receiving portion and a smaller portion which is generally of the same cross sectional area as the cavity and extends upwardly therefrom to an opening, disposing materials through said opening to fill said cavity and at least part of said smaller portion of said bore, said materials comprising carbide grains sintered together by a binder metal to form particles and a filler metal powder, and raising the temperature of the filler metal powder so that the filler metal flows about the particles to fill the spaces therebetween and allowing the filler metal to solidify to form a composite of the particles bonded together by the filler metal.

References Cited

UNITED STATES PATENTS

| 3,717,189 | 2/1973 | Gutshall | 152—210 |
| 3,593,771 | 7/1971 | Carlstedt et al. | 152—210 |
| 2,138,672 | 11/1938 | White | 75—213 |
| 1,895,354 | 1/1933 | Taylor | 75—213 |

FOREIGN PATENTS

| 524,465 | 5/1956 | Canada | 75—204 |
| 482,922 | 5/1952 | Canada | 75—204 |

CARL D. QUARFORTH, Primary Examiner

B. HUNT, Assistant Examiner

U.S. Cl. X.R.

75—200, 204, 213; 152—208, 210